(12) United States Patent  
Chen et al.

(10) Patent No.: US 11,252,665 B2
(45) Date of Patent: Feb. 15, 2022

(54) DATA TRANSMISSION METHOD, BASE STATION AND TERMINAL

(71) Applicant: VIVO MOBILE COMMUNICATION CO., LTD., Guangdong (CN)

(72) Inventors: Li Chen, Chang'an Dongguan (CN); Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 43 days.

(21) Appl. No.: 16/613,649

(22) PCT Filed: May 3, 2018

(86) PCT No.: PCT/CN2018/085455
§ 371 (c)(1),
(2) Date: Nov. 14, 2019

(87) PCT Pub. No.: WO2018/210135
PCT Pub. Date: Nov. 22, 2018

(65) Prior Publication Data
US 2020/0205076 A1    Jun. 25, 2020

(30) Foreign Application Priority Data
May 17, 2017    (CN) .......................... 201710348525.8

(51) Int. Cl.
*H04W 52/02*    (2009.01)
*H04W 76/28*    (2018.01)
(52) U.S. Cl.
CPC ... *H04W 52/0229* (2013.01); *H04W 52/0216* (2013.01); *H04W 76/28* (2018.02)

(58) Field of Classification Search
CPC .................................................... H04W 52/02
See application file for complete search history.

(56) References Cited

U.S. PATENT DOCUMENTS

| 9,832,754 B1* | 11/2017 | Akkarakaran ........ H04W 68/02 |
| 2006/0111127 A1* | 5/2006 | Jang ...................... H04W 68/00 |
| | | 455/458 |
| 2012/0275364 A1 | 11/2012 | Anderson et al. |
| 2014/0302855 A1 | 10/2014 | Nory et al. |
| 2015/0003311 A1* | 1/2015 | Feuersaenger ...... H04W 72/042 |
| | | 370/311 |
| 2016/0345294 A1 | 11/2016 | Bennett et al. |

(Continued)

FOREIGN PATENT DOCUMENTS

| CN | 1784076 A | 6/2006 |
| CN | 103268639 A | 8/2013 |
| CN | 103636264 A | 3/2014 |

(Continued)

OTHER PUBLICATIONS

Huawei Considerations on wakeup signal for eFeMTC (Year: 2017).*

(Continued)

*Primary Examiner* — Ayanah S George
(74) *Attorney, Agent, or Firm* — Maschoff Brennan (57) ABSTRACT

Provided are a data transmission method, a base station, and a terminal. The data transmission method includes: determining whether a terminal is in an idle mode and/or an inactive mode; when the terminal is in the idle mode and/or the inactive mode, sending a wake-up signaling to the terminal.

19 Claims, 3 Drawing Sheets

(56) References Cited

U.S. PATENT DOCUMENTS

2017/0094660 A1* 3/2017 Frederiksen ........ H04W 52/028
2020/0351779 A1* 11/2020 Sharma ................ H04W 76/28

FOREIGN PATENT DOCUMENTS

| CN | 105340334 A | 2/2016 |
| EP | 2 887 746 A1 | 6/2015 |
| EP | 3 619 972 A1 | 3/2020 |
| WO | 2016/146147 A1 | 9/2016 |
| WO | 2017/050586 A1 | 3/2017 |
| WO | 2017050586 A1 | 3/2017 |
| WO | 2018/204799 A1 | 11/2018 |

OTHER PUBLICATIONS

European Search Report in Application No. 18802924.3 dated Apr. 28, 2020.
CN Office Action in Application No. 201710348525.8 dated Dec. 4, 2019.
"Pagingin NR with Beam Sweeping" 3GPP TSG-RAN WG2 Meeting #97, Feb. 13, 2017.
"Consideration of 'wake-up signal' for eFeMTC" 3GPP TSG RAN WG1 Meeting #88bis, Apr. 3, 2017.
"Motivation of UE Wakeup Mechanism in NR", Datang Telecom Technology & Industry Group, 3GPP TSG RAN Meeting #75, Mar. 6, 2017.
Written Opinion and International Search Report in Application No. PCT/CN2018/085455 dated Nov. 28, 2019.
Huawei et al. "Considerations on Wake-up Signal for eFeMTC" 3GPP TSG RAN WG1 Meeting #88bis R1-1704282, Apr. 7, 2017.
EP Office Action dated Jun. 8, 2021 as received in Application No. 18802924.3.

* cited by examiner

DATA TRANSMISSION METHOD, BASE STATION AND TERMINAL

CROSS-REFERENCE TO RELATED APPLICATION

This application is the U.S. national phase of PCT Application PCT/CN2018/085455 filed on May 3, 2018, which claims the benefit and priority of Chinese Application No. 201710348525.8, filed on May 17, 2017, which is incorporated herein by reference in its entirety.

TECHNICAL FIELD

The present disclosure relates to the field of communication technologies, and in particular, to a data transmission method, a base station and a terminal.

BACKGROUND

In a connected state, a terminal (UE) needs to keep the UE awake during a time period of a discontinuous reception (DRX) inactivity timer, even if no corresponding grant is scheduled. This will result in power waste of the UE. When there is no corresponding data grant, an On Duration Timer will cause the UE to wake up during each DRX cycle, which will result in unnecessary power waste.

In the Long Term Evolution (LTE) system, in order to save power consumption of the UE, a DRX cycle is also introduced in an idle mode. The UE only monitors a physical downlink control channel (PDCCH) at a position corresponding to a paging frame (PF) and a paging opportunity (PO) which are calculated according to UE_ID, thereby receiving a paging message on a resource indicated by the PDCCH.

However, in the related art, there is no DRX wake-up mechanism in the idle mode and an inactive mode (it should be noted that the idle mode may refer to a state of the terminal at LTE or 5G, and the inactive mode may refer to a state of the terminal is at 5G). If the terminal is regularly awake in each DRX cycle in the idle mode to check whether there is a PDCCH and/or a paging message, this will waste the power consumption of the terminal.

SUMMARY

Embodiments of the present disclosure provides a data transmission method, a base station and a terminal, which can solve problems that in order to ensure reception of paging, the terminal checks whether there is a PDCCH and/or a paging message in each DRX cycle in the idle mode and the inactive mode, which causes a large power consumption of the terminal and is not conducive to saving power.

In order to solve the above technical problem, one embodiment of the present disclosure provides a data transmission method, including: determining whether a terminal is in an idle mode and/or an inactive mode; and sending a wake-up signaling to the terminal when the terminal is in the idle mode and/or the inactive mode.

One embodiment of the present disclosure further provides a base station, including: a first determining module configured to determine whether a terminal is in an idle mode and/or an inactive mode; and a first sending module configured to send a wake-up signaling to the terminal when the terminal is in the idle mode and/or the inactive mode.

One embodiment of the present disclosure further provides a base station, including: a memory, a processor and a computer program stored on the memory and executable by the processor; wherein the processor executes the computer program to implement steps of the above data transmission method.

One embodiment of the present disclosure further provides a computer readable storage medium storing a computer program, wherein the computer program is executed by a processor to implement steps of the above data transmission method.

One embodiment of the present disclosure further provides a data transmission method including: in an idle mode and/or an inactive mode, receiving a wake-up signaling sent by a base station; and performing a processing operation corresponding to the wake-up signaling according to the wake-up signaling.

One embodiment of the present disclosure further provides a terminal, including: a first receiving module configured to receive a wake-up signaling sent by a base station when the terminal is in an idle mode and/or an inactive mode; a first execution module configured to perform a processing operation corresponding to the wake-up signaling according to the wake-up signaling.

One embodiment of the present disclosure further provides a terminal, including: a memory, a processor and a computer program stored on the memory and executable by the processor; wherein the processor executes the computer program to implement steps of the above data transmission method.

One embodiment of the present disclosure further provides a computer readable storage medium storing a computer program, wherein the computer program is executed by a processor to implement steps of the above data transmission method.

The beneficial effects of the present disclosure are as follows.

In the above solutions, when the terminal is in an idle mode and/or an inactive mode, the base station sends the wake-up signaling to the terminal, so that the terminal receives the wake-up signaling sent by the base station before waking up in each DRX cycle, and then determines whether a subsequent operation is to continue to maintain a state before receiving the wake-up signaling, or to wake up to receive the PDCCH and the corresponding paging message. This prevents the terminal from checking whether there is a PDCCH and/or a paging message in each DRX cycle and then reduces the power consumption of the terminal.

DETAILED DESCRIPTION

In order to make the objects, the technical solutions and the advantages of the present disclosure more apparent, the present disclosure will be described hereinafter in a clear and complete manner in conjunction with the drawings and embodiments.

The present disclosure provides a data transmission method, a base station and a terminal, which can solve problems that in order to ensure reception of paging, the terminal checks whether there is a PDCCH and/or a paging message in each DRX cycle in the idle mode and the inactive mode, which causes a large power consumption of the terminal and is not conducive to saving power.

Figure 1:
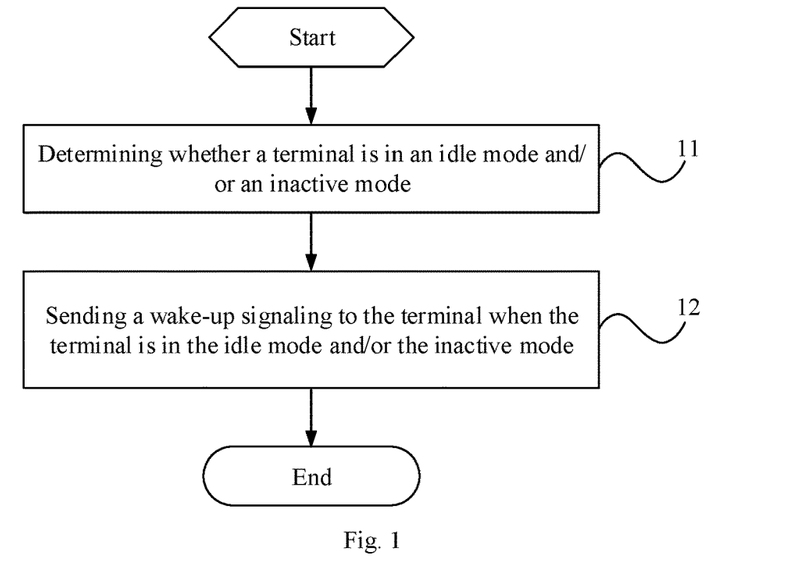
FIG. 1 is a flow chart of a data transmission method according to an embodiment of the present disclosure.

As shown in FIG. 1, an embodiment of the present disclosure provides a data transmission method, including:

Step 11: determining whether a terminal is in an idle mode and/or an inactive mode;

Step 12: sending a wake-up signaling to the terminal when the terminal is in the idle mode and/or the inactive mode.

It should be noted that the data transmission method of this embodiment is applied to a base station. When the terminal is in the idle mode and/or the inactive mode, the base station sends a wake-up signaling to the terminal, thereby waking up the terminal to receive corresponding data. The method avoids the problems that the terminal checks whether there is a PDCCH and/or a paging message in each DRX cycle, which causes a large power consumption of the terminal. In this way, the method can reduce the power consumption of the terminal and is conductive to saving power of the terminal.

It should be noted that, when the step 12 is implemented, one specific implementation manner includes: determining whether there is a paging message to be sent to the terminal; when there is a paging message to be sent to the terminal, sending the wake-up signaling to the terminal.

It should be noted that the base station does not always wake up the terminal. In this embodiment, only when the base station determines that there is a paging message to be sent, the base station sends the wake-up signaling to the terminal to instruct the terminal to monitor the corresponding PDCCH and receive subsequent possible paging messages.

It should be noted that, when transmitting system information, the base station may send to the terminal an system information change indication in downlink control information (DCI) corresponding to the PDCCH, without transmission of the paging message; when transmitting data, the base station sends a paging message and PDCCH.

It should be noted that, operations performed by the terminal may be varied dependent on different contents included in the wake-up signaling, thus, the terminal performs a processing operation corresponding to the wake-up signaling according to the specific content included in the wake-up signaling.

Specific implementation manners of the base station and the terminal are respectively described below based on the specific content included in the wake-up signaling.

First, the wake-up signaling includes identification information of the terminal. The identification information is preset identification information of the terminal or identification information of a group in which the terminal is located.

It should be noted that the wake-up signaling sent by the base station may be directed to only one terminal, or may be directed to a group of terminals, that is, one wake-up signaling sent by the base station may instruct a group of terminals with a same group identifier.

Specifically, the identification information is preset information or a variant of the preset information.

The preset information includes one of International Mobile Subscriber Identity (IMSI), Serving-Temporary Mobile Subscriber Identity (S-TMSI), Temporary Mobile Subscriber Identity (TMSI), Packet-Temporary Mobile Subscriber Identity (P-TMSI), Resume ID and Configured ID.

The Configured ID is configured via a Radio Resource Control (RRC) release signaling or a suspend signaling.

The variant of the preset information is obtained in one of ways that include intercepting some bytes in the preset information, obtaining a remainder by dividing the preset information by a preset value, obtaining a hash function transformation identity (Hashed_ID) by performing hash function transformation of the preset information, and intercepting some bytes in the Hashed_ID.

For this situation, after the terminal receives the wake-up signaling, the terminal first determines whether the wake-up signaling includes the identification information of the terminal. When the wake-up signaling includes the identification information of the terminal, the terminal monitors the physical downlink control channel (PDCCH) and/or receives a corresponding paging message on the resource scheduled by the PDCCH. When the wake-up signaling does not include the identification information of the terminal, the terminal continues to maintain the state, the state being a state of the terminal before receiving the wake-up signaling (i.e., the terminal continues to sleep until the next DRX cycle), or the terminal does not monitor PDCCH at a time indicated by at least one paging frame (PF) and a paging opportunity (PO) in the same DRX cycle after receiving the wake-up signaling.

Second, the wake-up signaling includes: system information change indication information.

It should be noted that, in this case, since the system information change indication information has been sent by the wake-up signaling, the base station does not need to separately send the paging message and/or the corresponding physical downlink control channel PDCCH for changes of the system information.

Correspondingly, when the terminal receives the wake-up signaling including the system information change indication information, the terminal only needs to receive updated system information sent by the base station at a first preset resource location.

The first preset resource location is a time predefined by the base station for the terminal for receiving the system information.

Third, the wake-up signaling includes an indicator. The indicator is configured to indicate whether there is a paging message and/or a PDCCH to be transmitted in the DRX cycle after the terminal receives the wake-up signaling.

It should be noted that the indicator may be indicated with 1 bit, or may be indicated with multiple bits.

Correspondingly, the terminal determines whether the wake-up signaling includes the indicator. When the wake-up signaling includes the indicator and the indicator indicates that there is no paging message and/or PDCCH to be transmitted in the DRX cycle after the wake-up signaling, the terminal continues to maintain the state, the state being a state of the terminal before receiving the wake-up signaling, or, the terminal does not monitor PDCCH or does not receive the corresponding paging message in the same DRX cycle after receiving the wake-up signaling, or, the terminal receives updated system information sent by the base station at a second preset resource location (this situation means that when the system information is changed, the terminal receives the updated system information sent by the base station at the preset resource location). When the wake-up signaling includes the indicator and the indicator indicates that there is a paging message and/or PDCCH to be transmitted in the DRX cycle after the wake-up signaling, the terminal monitors PDCCH and/or receives the corresponding paging message on a resource scheduled by PDCCH.

When the base station sends the wake-up signaling, the base station may send the wake-up signaling to the terminal on multiple beams by means of beam sweeping.

It should be noted that sweeping related information mainly includes configuration information such as a sweeping pattern. The sweeping related information may be configured by the base station in the system information (SI).

Optionally, when the base station sends the wake-up signaling, the base station may send the wake-up signaling to the terminal at a preset time;

The preset time includes: a paging opportunity (PO) start time or a predetermined time before the PO start time. The predetermined time is predefined by a network or configured by the base station.

It should be noted that, after the base station determines that the wake-up signaling needs to be sent to the terminal, the base station usually sends a PDCCH and/or a paging message to the terminal in the subsequent process. Optionally, the base station sends the PDCCH and the paging message on multiple beams by using the beam sweeping.

It should be noted that the sweeping related information mainly includes configuration information such as a sweeping pattern. The sweeping related information may be configured by the base station in the SI.

In the above embodiment of the present disclosure, when the terminal is in the idle mode and/or the inactive mode, the base station sends the wake-up signaling to the terminal. Then, the terminal receives the wake-up signaling sent by the base station before waking up in each DRX cycle, and then the terminal determines whether the subsequent operation is to continue to maintain the state, the state being a state of the terminal before receiving the wake-up signaling, or to wake up to receive PDCCH and the corresponding paging message. This prevents the terminal from checking whether there is a PDCCH and/or a paging message in each DRX cycle and then reduces the power consumption of the terminal.

Figure 2:
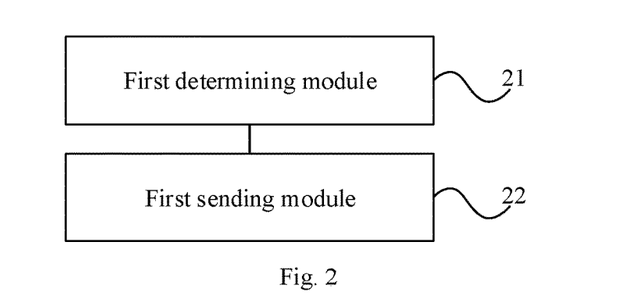
FIG. 2 is a schematic diagram showing modules of a base station according to an embodiment of the present disclosure.

As shown in FIG. 2, an embodiment of the present disclosure provides a base station, including:

a first determining module 21 configured to determine whether a terminal is in an idle mode and/or an inactive mode;

a first sending module 22 configured to send a wake-up signaling to the terminal when the terminal is in the idle mode and/or the inactive mode.

Optionally, the first sending module 22 includes:

a first determining unit, configured to determine whether there is a paging message to be sent to the terminal; and a sending unit, configured to send the wake-up signaling to the terminal when there is a paging message to be sent to the terminal.

Specifically, the wake-up signaling includes: identification information of the terminal. The identification information is preset identification information of the terminal or identification information of a group in which the terminal is located.

Specifically, the identification information is preset information or a variant of the preset information.

The preset information includes one of International Mobile Subscriber Identity (IMSI), Serving-Temporary Mobile Subscriber Identity (S-TMSI), Temporary Mobile Subscriber Identity (TMSI), Packet-Temporary Mobile Subscriber Identity (P-TMSI), Resume ID and Configured ID.

The Configured ID is configured via a Radio Resource Control (RRC) release signaling or a suspend signaling.

The variant of the preset information is obtained in one of ways that include intercepting some bytes in the preset information, obtaining a remainder by dividing the preset information by a preset value, obtaining a hash function transformation identity (Hashed_ID) by performing hash function transformation of the preset information, and intercepting some bytes in the Hashed_ID.

Optionally, the wake-up signaling further includes system information change indication information.

When the wake-up signaling further includes the system information change indication information, the base station does not need to separately send the paging message and/or the corresponding physical downlink control channel PDCCH for changes of the system information.

Optionally, the wake-up signaling further includes an indicator. The indicator is configured to indicate whether there is a paging message and/or a PDCCH to be transmitted in the DRX cycle after the terminal receives the wake-up signaling.

Optionally, the first sending module 22 is configured to send the wake-up signaling to the terminal on multiple beams by means of beam sweeping.

Optionally, the first sending module 22 is configured to send the wake-up signaling to the terminal at a preset time.

The preset time includes: a paging opportunity PO starting time or a predetermined time before the PO starting time.

The predetermined time is predefined by the network or configured by the base station.

Specifically, the base station further includes: a second sending module configured to send a PDCCH and/or a paging message to the terminal.

The second sending module is configured to send the PDCCH and/or the paging message to the terminal on multiple beams by means of beam sweeping.

It should be noted that, when the terminal is in the idle mode and/or the inactive mode, the base station of the present disclosure sends the wake-up signaling to the terminal. Then, the terminal receives the wake-up signaling sent by the base station before waking up in each DRX cycle, and then the terminal determines whether the subsequent operation is to continue to maintain the state, the state being a state of the terminal before receiving the wake-up signaling, or to wake up to receive PDCCH and the corresponding paging message. This prevents the terminal from checking whether there is a PDCCH and/or a paging message in each DRX cycle and then reduces the power consumption of the terminal.

An embodiment of the present disclosure further provides a base station, including: a memory, a processor, and a computer program stored on the memory and executable by the processor. The processor executes the computer program to implement following process:

determining whether a terminal is in an idle mode and/or an inactive mode;

sending a wake-up signaling to the terminal when the terminal is in the idle mode and/or the inactive mode.

Optionally, the processor is further configured to: determine whether there is a paging message to be sent to the terminal; when there is a paging message to be sent to the terminal, send the wake-up signaling to the terminal.

The wake-up signaling includes identification information of the terminal. The identification information is preset identification information of the terminal or identification information of a group in which the terminal is located.

The identification information is preset information or a variant of the preset information.

The preset information includes one of International Mobile Subscriber Identity (IMSI), Serving-Temporary Mobile Subscriber Identity (S-TMSI), Temporary Mobile Subscriber Identity (TMSI), Packet-Temporary Mobile Subscriber Identity (P-TMSI), Resume ID and Configured ID.

The Configured ID is configured via a Radio Resource Control (RRC) release signaling or a suspend signaling.

The variant of the preset information is obtained in one of ways that include intercepting some bytes in the preset information, obtaining a remainder by dividing the preset information by a preset value, obtaining a hash function transformation identity (Hashed_ID) by performing hash function transformation of the preset information, and intercepting some bytes in the Hashed_ID.

Optionally, the wake-up signaling further includes system information change indication information.

It should be noted that, when the wake-up signaling further includes the system information change indication information, the base station does not need to separately send the paging message and/or the corresponding physical downlink control channel PDCCH for changes of the system information.

Optionally, the wake-up signaling further includes an indicator. The indicator is configured to indicate whether there is a paging message and/or a PDCCH to be transmitted in the DRX cycle after the terminal receives the wake-up signaling.

Optionally, the processor is configured to send the wake-up signaling to the terminal on multiple beams by means of beam sweeping.

Optionally, the processor is configured to send the wake-up signaling to the terminal at a preset time.

The preset time includes: a paging opportunity PO starting time or a predetermined time before the PO starting time.

The predetermined time is predefined by the network or configured by the base station.

Optionally, the processor is configured to send the PDCCH and/or the paging message to the terminal.

Optionally, the processor is configured to send the PDCCH and/or the paging message to the terminal on multiple beams by means of beam sweeping.

When the terminal is in the idle mode and/or the inactive mode, the base station of the embodiment sends the wake-up signaling to the terminal. Then, the terminal receives the wake-up signaling sent by the base station before waking up in each DRX cycle, and then the terminal determines whether the subsequent operation is to continue to maintain the state, the state being a state of the terminal before receiving the wake-up signaling, or to wake up to receive PDCCH and the corresponding paging message. This prevents the terminal from checking whether there is a PDCCH and/or a paging message in each DRX cycle and then reduces the power consumption of the terminal.

Figure 3:
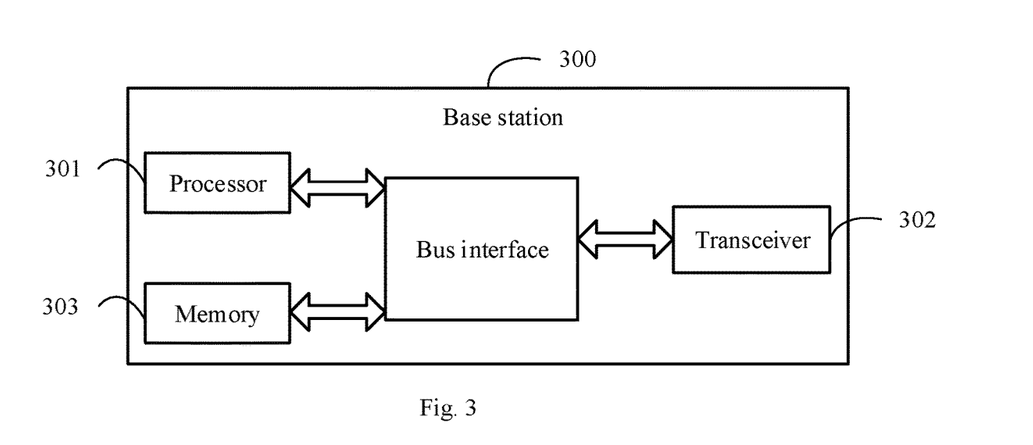
FIG. 3 is a block diagram of a base station according to an embodiment of the present disclosure.

FIG. 3 is a block diagram of a base station according to an embodiment of the present disclosure, which can implement the details of the data transmission method applied to the base station and achieve the same effect. As shown in FIG. 3, the base station 300 includes a processor 301, a transceiver 302, a memory 303, and a bus interface.

The processor 301 is configured to read a program in the memory 303 and perform the following process:

determining whether a terminal is in an idle mode and/or an inactive mode;

sending a wake-up signaling to the terminal through the transceiver 302 when the terminal is in the idle mode and/or the inactive mode.

Optionally, the processor 301 is further configured to: determine whether there is a paging message to be sent to the terminal; when there is a paging message to be sent to the terminal, send the wake-up signaling to the terminal.

As shown in FIG. 3, a bus architecture can include any number of interconnected buses and bridges. Specifically, various circuits of one or more processors, which are represented by the processor 301, and the storage, which is represented by the memory 303, are linked together. The bus architecture may link various other circuits, such as a peripheral device, voltage regulator and a power management circuit together. These features are well known in this field, therefore, this disclosure does not make further description on these features. The bus interface provides an interface. The transceiver 302 can be multiple elements, including a transmitter and a receiver and provide units, which communicate with other devices on the transmission medium.

The processor 301 is responsible for managing the bus architecture and common processing and the memory 303 may store data used by the processor 301 when executing the operations.

The wake-up signaling includes identification information of the terminal. The identification information is preset identification information of the terminal or identification information of a group in which the terminal is located.

The identification information is preset information or a variant of the preset information.

The preset information includes one of International Mobile Subscriber Identity (IMSI), Serving-Temporary Mobile Subscriber Identity (S-TMSI), Temporary Mobile Subscriber Identity (TMSI), Packet-Temporary Mobile Subscriber Identity (P-TMSI), Resume ID and Configured ID.

The Configured ID is configured via a Radio Resource Control (RRC) release signaling or a suspend signaling.

The variant of the preset information is obtained in one of ways that include intercepting some bytes in the preset information, obtaining a remainder by dividing the preset information by a preset value, obtaining a hash function transformation identity (Hashed_ID) by performing hash function transformation of the preset information, and intercepting some bytes in the Hashed_ID.

Optionally, the wake-up signaling further includes system information change indication information.

It should be noted that, when the wake-up signaling further includes the system information change indication information, the base station does not need to separately send the paging message and/or the corresponding physical downlink control channel PDCCH for changes of the system information.

Optionally, the wake-up signaling further includes an indicator. The indicator is configured to indicate whether there is a paging message and/or a PDCCH to be transmitted in the DRX cycle after the terminal receives the wake-up signaling.

Optionally, the processor 301 is configured to send the wake-up signaling to the terminal on multiple beams by means of beam sweeping.

Optionally, the processor 301 is configured to send the wake-up signaling to the terminal through the transceiver 302 at a preset time.

The preset time includes: a paging opportunity PO starting time or a predetermined time before the PO starting time.

The predetermined time is predefined by the network or configured by the base station.

Optionally, the processor 301 is configured to send the PDCCH and/or the paging message to the terminal through the transceiver 302.

Optionally, the processor 301 is configured to send the PDCCH and/or the paging message to the terminal through the transceiver 302 on multiple beams by means of beam sweeping.

When the terminal is in the idle mode and/or the inactive mode, the base station of the embodiment sends the wake-up signaling to the terminal. Then, the terminal receives the wake-up signaling sent by the base station before waking up in each DRX cycle, and then the terminal determines whether the subsequent operation is to continue to maintain the state, the state being a state of the terminal before receiving the wake-up signaling, or to wake up to receive PDCCH and the corresponding paging message. This prevents the terminal from checking whether there is a PDCCH and/or a paging message in each DRX cycle and then reduces the power consumption of the terminal.

Figure 4:
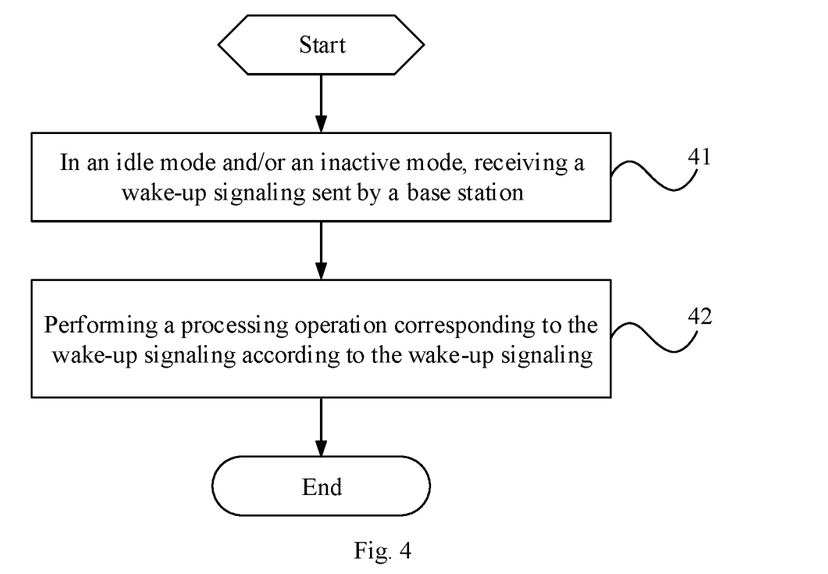
FIG. 4 is a flow chart of a data transmission method according to an embodiment of the present disclosure.

As shown in FIG. 4, a data transmission method according to an embodiment of the present disclosure is applied to a terminal and includes:

Step 41: in an idle mode and/or an inactive mode, receiving a wake-up signaling sent by a base station;

Step 42: performing a processing operation corresponding to the wake-up signaling according to the wake-up signaling.

Specifically, the step 42 is implemented in a manner that includes:

determining whether the wake-up signaling includes identification information of the terminal;

when the wake-up signaling includes the identification information of the terminal, monitoring a physical downlink control channel PDCCH and/or receiving a corresponding paging message on a resource scheduled by the PDCCH;

when the wake-up signaling does not include the identification information of the terminal, the terminal continuing to maintain a state, the state being a state of the terminal before receiving the wake-up signaling, or not monitoring the PDCCH at a time indicated by at least one paging frame (PF) and a paging opportunity (PO) in the same DRX cycle after receiving the wake-up signaling.

The identification information is preset identification information of the terminal or identification information of a group in which the terminal is located.

Specifically, the identification information is preset information or a variant of the preset information.

The preset information includes one of International Mobile Subscriber Identity (IMSI), Serving-Temporary Mobile Subscriber Identity (S-TMSI), Temporary Mobile Subscriber Identity (TMSI), Packet-Temporary Mobile Subscriber Identity (P-TMSI), Resume ID and Configured ID.

The Configured ID is configured via a Radio Resource Control (RRC) release signaling or a suspend signaling.

The variant of the preset information is obtained in one of ways that include intercepting some bytes in the preset information, obtaining a remainder by dividing the preset information by a preset value, obtaining a hash function transformation identity (Hashed_ID) by performing hash function transformation of the preset information, and intercepting some bytes in the Hashed_ID.

Optionally, the data transmission method further includes: determining whether the wake-up signaling includes system information change indication information; when the wake-up signaling includes system information change indication information, after the terminal receives the wake-up signaling, the terminal receiving updated system information sent by the base station at a first preset resource location.

Optionally, the data transmission method further includes: determining whether the wake-up signaling includes an indicator which is configured to indicate whether there is a paging message and/or a PDCCH to be transmitted in the DRX cycle after the terminal receives the wake-up signaling;

when the wake-up signaling includes the indicator and the indicator indicates that there is no paging message and/or PDCCH to be transmitted in the DRX cycle after the wake-up signaling, the terminal continuing to maintain the state, the state being a state of the terminal before receiving the wake-up signaling, or, the terminal not monitoring the PDCCH and/or not receiving the corresponding paging message in the same DRX cycle after receiving the wake-up signaling, or, the terminal receiving updated system information sent by the base station at a second preset resource location;

when the wake-up signaling includes the indicator and the indicator indicates that there is a paging message and/or PDCCH to be transmitted in the DRX cycle after the wake-up signaling, the terminal monitoring the PDCCH and/or receiving the corresponding paging message on a resource scheduled by PDCCH.

It should be noted that, in the foregoing embodiment, all the descriptions of the terminal are applicable to the embodiment of the data transmission method applied to the terminal, and the terminal using the data transmission method reduces the power consumption of the terminal and reduces consumption of electrical energy for the terminal, thereby improving user's experience.

Figure 5:
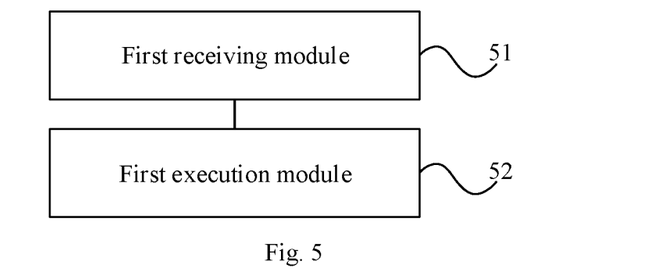
FIG. 5 is a schematic diagram showing modules of a terminal according to an embodiment of the present disclosure.

As shown in FIG. 5, the terminal according to an embodiment of the present disclosure includes:

a first receiving module 51 configured to receive a wake-up signaling sent by a base station when in an idle mode and/or an inactive mode;

a first execution module 52 configured to perform a processing operation corresponding to the wake-up signaling according to the wake-up signaling.

Specifically, the first execution module 52 includes:

a second determining unit configured to determine whether the wake-up signaling includes identification information of the terminal;

a first execution unit configured to, when the wake-up signaling includes the identification information of the terminal, monitor a physical downlink control channel (PDCCH) and/or receive a corresponding paging message on a resource scheduled by the PDCCH;

a second execution unit configured to, when the wake-up signaling does not include the identification information of the terminal, enable the terminal to continue to maintain a state, the state being a state of the terminal before receiving the wake-up signaling, or enable the terminal to not monitor PDCCH at a time indicated by at least one paging frame (PF) and a paging opportunity (PO) in the same DRX cycle after receiving the wake-up signaling.

The identification information is preset identification information of the terminal or identification information of a group in which the terminal is located.

The identification information is preset information or a variant of the preset information.

The preset information includes one of International Mobile Subscriber Identity (IMSI), Serving-Temporary Mobile Subscriber Identity (S-TMSI), Temporary Mobile Subscriber Identity (TMSI), Packet-Temporary Mobile Subscriber Identity (P-TMSI), Resume ID and Configured ID.

The Configured ID is configured via a Radio Resource Control (RRC) release signaling or a suspend signaling.

The variant of the preset information is obtained in one of ways that include intercepting some bytes in the preset information, obtaining a remainder by dividing the preset information by a preset value, obtaining a hash function transformation identity (Hashed_ID) by performing hash function transformation of the preset information, and intercepting some bytes in the Hashed_ID.

Optionally, the terminal further includes:

a second determining module configured to determine whether the wake-up signaling includes system information change indication information;

a second receiving module configured to, when the wake-up signaling includes the system information change indication information, after receiving the wake-up signaling, enabling the terminal to receive updated system information sent by the base station at a first preset resource location.

Optionally, the terminal further includes:

a third determining module configured to determine whether the wake-up signaling includes an indicator which is configured to indicate whether there is a paging message and/or a PDCCH to be transmitted in the DRX cycle after the terminal receives the wake-up signaling;

a second execution module configured to, when the wake-up signaling includes the indicator and the indicator indicates that there is no paging message and/or PDCCH to be transmitted in the DRX cycle after the wake-up signaling, enable the terminal to continue to maintain the state, the state being a state of the terminal before receiving the wake-up signaling, or, enable the terminal to not monitor the PDCCH and/or not receive the corresponding paging message in the same DRX cycle after receiving the wake-up signaling, or, enable the terminal to receive updated system information sent by the base station at a second preset resource location;

a third execution module configured to, when the wake-up signaling includes the indicator and the indicator indicates that there is a paging message and/or PDCCH to be transmitted in the DRX cycle after the wake-up signaling, enable the terminal to monitor the PDCCH and/or receive the corresponding paging message on a resource scheduled by PDCCH.

It should be noted that, the terminal embodiment is a terminal corresponding to the data transmission method applied to the terminal, and all the implementation manners of the foregoing embodiments are applicable to the terminal embodiment, and the same technical effects can be achieved.

An embodiment of the present disclosure further provides a terminal, including: a memory, a processor, and a computer program stored on the memory and executable by the processor. The processor executes the computer program to implement the following process:

in an idle mode and/or an inactive mode, receiving a wake-up signaling sent by a base station;

performing a processing operation corresponding to the wake-up signaling according to the wake-up signaling.

Optionally, the processor is further configured to, determine whether the wake-up signaling includes identification information of the terminal;

when the wake-up signaling includes the identification information of the terminal, monitor a physical downlink control channel PDCCH and/or receive a corresponding paging message on a resource scheduled by the PDCCH;

when the wake-up signaling does not include the identification information of the terminal, enabling the terminal to continue to maintain a state, the state being a state of the terminal before receiving the wake-up signaling, or to not monitor the PDCCH at a time indicated by at least one paging frame (PF) and a paging opportunity (PO) in the same DRX cycle after receiving the wake-up signaling.

The identification information is preset identification information of the terminal or identification information of a group in which the terminal is located.

Specifically, the identification information is preset information or a variant of the preset information.

The preset information includes one of International Mobile Subscriber Identity (IMSI), Serving-Temporary Mobile Subscriber Identity (S-TMSI), Temporary Mobile Subscriber Identity (TMSI), Packet-Temporary Mobile Subscriber Identity (P-TMSI), Resume ID and Configured ID.

The Configured ID is configured via a Radio Resource Control (RRC) release signaling or a suspend signaling.

The variant of the preset information is obtained in one of ways that include intercepting some bytes in the preset information, obtaining a remainder by dividing the preset information by a preset value, obtaining a hash function transformation identity (Hashed_ID) by performing hash function transformation of the preset information, and intercepting some bytes in the Hashed_ID.

Optionally, the processor is further configured to, determine whether the wake-up signaling includes system information change indication information; when the wake-up signaling includes system information change indication information, after the terminal receives the wake-up signaling, enable the terminal to receive updated system information sent by the base station at a first preset resource location.

Optionally, the processor is further configured to, determine whether the wake-up signaling includes an indicator which is configured to indicate whether there is a paging message and/or a PDCCH to be transmitted in the DRX cycle after the terminal receives the wake-up signaling;

when the wake-up signaling includes the indicator and the indicator indicates that there is no paging message and/or PDCCH to be transmitted in the DRX cycle after the wake-up signaling, enable the terminal to continue to maintain the state, the state being a state of the terminal before receiving the wake-up signaling, or, enable the terminal to not monitor the PDCCH and/or not receive the corresponding paging message in the same DRX cycle after receiving the wake-up signaling, or, enable the terminal to receive updated system information sent by the base station at a second preset resource location;

when the wake-up signaling includes the indicator and the indicator indicates that there is a paging message and/or PDCCH to be transmitted in the DRX cycle after the wake-up signaling, monitor the PDCCH and/or receive the corresponding paging message on a resource scheduled by PDCCH.

It is to be noted that the terminal in the embodiment of the present disclosure receives the wake-up signaling sent by the base station when the terminal is in the idle mode and/or the inactive mode, and then performs a processing operation corresponding to the wake-up signaling according to the wake-up signaling. The wake-up of the terminal is controlled by the base station, which prevents the terminal from checking whether there is a PDCCH and/or a paging message in each DRX cycle. In this way, the power consumption of the terminal is reduced, and consumption of electrical energy for the terminal is reduced, thereby improving user's experience.

Figure 6:
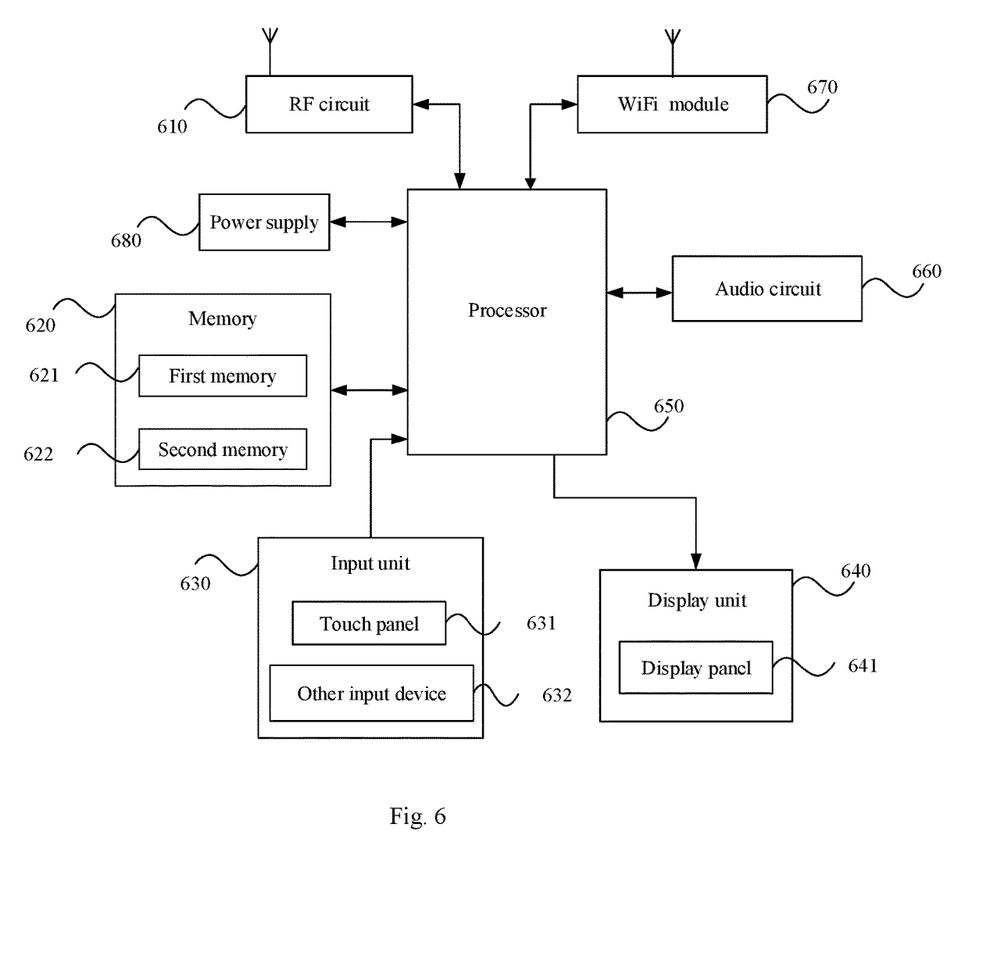
FIG. 6 is a block diagram of a terminal according to an embodiment of the present disclosure.

FIG. 6 is a block diagram of a terminal according to an embodiment of the present disclosure. Specifically, the terminal in FIG. 6 may be a mobile phone, a tablet computer, a personal digital assistant (PDA), or an on-board computer.

The terminal in FIG. 6 includes a radio frequency (RF) circuit 610, a memory 620, an input unit 630, a display unit 640, a processor 650, an audio circuit 660, a Wireless Fidelity (WiFi) module 670 and a power supply 680.

The input unit 630 may be configured to receive numeric or character information inputted by a user, and generate an input of signal, which is relevant with user settings and function control of the terminal 600. Specifically, in the embodiment of the present disclosure, the input unit 630 may include a touch panel 631. The touch panel 631, also referred to as touch screen, may collect touch operations of the user on or around the touch screen (e.g., a user's operations on the touch panel 631 by using a finger, a touch pen, or any appropriate object or attachment), and drive a corresponding connection device, based on a preset program. Optionally, the touch panel 631 may include two parts, e.g., a touch detecting device, and a touch controller. The touch detecting device is configured to detect a touch direction of a user, detect a signal from a touch operation, and transmit the signal to the touch controller. The touch controller is configured to receive touch information from the touch detecting device, convert the touch information to contact coordinates, transmit the contact coordinates to the processor 650, receive and execute a command from the processor 650. In addition, the touch panel 631 may be implemented by various types, such as, resistive, capacitive, infrared, and surface acoustic waves. In addition to the touch panel 631, the input unit 630 may also include other input device 632, which may include, but is not limited to, one or more of a physical keyboard, function keys (such as volume control buttons, switch buttons, etc.), trackball, mouse, joystick, and the like.

The display unit 640 may be configured to display information inputted by the user, or information provided for the user, and various menu interfaces of the terminal. The display unit 640 may include a display panel 641. Optionally, the display panel 641 may be configured by using LCD, or Organic Light-Emitting Diode (OLED).

It should be noted that, the touch panel 631 may cover the display panel 641 to form a touch display. When the touch display detects a touch operation on, or around it, the touch display transmits to the processor 650, so as to determine the type of the touch event. Subsequently, the processor 650 provides a corresponding visual output on the touch display based on the type of the touch event.

The touch display includes an application interface display area and a common control display area. Arrangements of the application interface display area and common control display area are not limited, which may be two display areas, such as, up and down, left and right. The application interface display area may be configured to display an application interface. Each interface may include interface elements, such as, an icon of at least one application, and/or, widget desktop control, and so on. The application interface display area may also be an empty interface without any content. The common control display area is configured to display highly used controls, e.g., application icons, such as, a setting button, an interface number, a scroll bar, a phone book icon, and so on.

The processor 650 is a control center of the terminal. The processor 650 connects each part of the whole mobile phone, by using various interfaces and lines. The processor 650 performs various functions of the terminal, and processes data, by running or executing software programs, and/or, modules in the first memory 621, and calls data in the second memory 622, so as to perform an overall monitor on the terminal. Optionally, the processor 650 may include one or more processing units.

In the embodiment of the present disclosure, by calling the software programs, and/or, modules in the first memory 621, and data in the second memory 632, the processor 650 is configured to: in an idle mode and/or an inactive mode, receive a wake-up signaling sent by a base station; and perform a processing operation corresponding to the wake-up signaling according to the wake-up signaling.

Optionally, the processor 650 is further configured to, determine whether the wake-up signaling includes identification information of the terminal; when the wake-up signaling includes the identification information of the terminal, monitor a physical downlink control channel PDCCH and/or receive a corresponding paging message on a resource scheduled by the PDCCH; when the wake-up signaling does not include the identification information of the terminal, enable the terminal to continue to maintain a state, the state being a state of the terminal before receiving the wake-up signaling, or to not monitor the PDCCH at a time indicated by at least one paging frame (PF) and a paging opportunity (PO) in the same DRX cycle after receiving the wake-up signaling.

The identification information is preset identification information of the terminal or identification information of a group in which the terminal is located.

Specifically, the identification information is preset information or a variant of the preset information.

The preset information includes one of International Mobile Subscriber Identity (IMSI), Serving-Temporary Mobile Subscriber Identity (S-TMSI), Temporary Mobile Subscriber Identity (TMSI), Packet-Temporary Mobile Subscriber Identity (P-TMSI), Resume ID and Configured ID.

The Configured ID is configured via a Radio Resource Control (RRC) release signaling or a suspend signaling.

The variant of the preset information is obtained in one of ways that include intercepting some bytes in the preset information, obtaining a remainder by dividing the preset information by a preset value, obtaining a hash function transformation identity (Hashed_ID) by performing hash function transformation of the preset information, and intercepting some bytes in the Hashed_ID.

Optionally, the processor 650 is further configured to, determine whether the wake-up signaling includes system information change indication information; when the wake-up signaling includes system information change indication information, after the terminal receives the wake-up signaling, enable the terminal to receive updated system information sent by the base station at a first preset resource location.

Optionally, the processor 650 is further configured to, determine whether the wake-up signaling includes an indicator which is configured to indicate whether there is a paging message and/or a PDCCH to be transmitted in the DRX cycle after the terminal receives the wake-up signaling; when the wake-up signaling includes the indicator and the indicator indicates that there is no paging message and/or PDCCH to be transmitted in the DRX cycle after the wake-up signaling, enable the terminal to continue to maintain the state, the state being a state of the terminal before receiving the wake-up signaling, or, enable the terminal to not monitor the PDCCH and/or not receive the corresponding paging message in the same DRX cycle after receiving the wake-up signaling, or, enable the terminal to receive updated system information sent by the base station at a second preset resource location; when the wake-up signaling includes the indicator and the indicator indicates that there is a paging message and/or PDCCH to be transmitted in the DRX cycle after the wake-up signaling, monitor the PDCCH and/or receive the corresponding paging message on a resource scheduled by PDCCH.

The terminal in the embodiment of the present disclosure can implement various processes implemented by the terminal in the foregoing embodiment. To avoid repetition, details are not described herein again.

The processor 650 of the terminal of the embodiment of the present disclosure receives the wake-up signaling sent by the base station when the terminal is in the idle mode and/or the inactive mode; and performs a processing operation corresponding to the wake-up signaling according to the wake-up signaling. The wake-up of the terminal is controlled by the base station, which prevents the terminal from checking whether there is a PDCCH and/or a paging message in each DRX cycle. In this way, the power consumption of the terminal is reduced, and consumption of electrical energy for the terminal is reduced, thereby improving user's experience.

The various embodiments in the present specification are described in a progressive manner, and each embodiment focuses on differences from other embodiments, and the same or similar parts between the various embodiments can be referred to each other.

Those skilled in the art will appreciate that embodiments of the disclosed embodiments may be provided as a method, a device, or a computer program product. Thus, the embodiments of the present disclosure may take the form of an entirely hardware embodiment, an entirely software embodiment, or a combination of software and hardware. Moreover, the embodiments of the present disclosure may take the form of a computer program product embodied on one or more computer usable storage media (including but not limited to a disk storage, CD-ROM, an optical storage, etc.) including computer usable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although optional embodiments of the embodiments of the present invention have been described, it will be apparent that those skilled in the art can make further changes and modifications to the embodiments. Therefore, the appended claims are intended to be interpreted as including the optional embodiments and all changes and modifications that fall within the scope of the present disclosure.

It should also be noted that in this application, relational terms such as first and second are merely used to differentiate different components rather than to represent any order, number or importance. Further, the term "including", "include" or any variants thereof is intended to cover a non-exclusive contain, so that a process, a method, an article or a terminal device, which includes a series of elements, includes not only those elements, but also includes other elements which are not explicitly listed, or elements inherent in such a process, method, article or terminal device. In absence of any further restrictions, an element defined by the phrase "including one . . . " does not exclude the existence of additional identical elements in a process, method, article, or terminal device that includes the element.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A data transmission method operable by a base station, comprising:
   determining whether a terminal is in an inactive mode; and
   sending a wake-up signaling to the terminal when the terminal is in the inactive mode;
   wherein the step of sending the wake-up signaling to the terminal, comprises:
   determining whether there is a paging message to be sent to the terminal; and
   when there is a paging message to be sent to the terminal, sending the wake-up signaling to the terminal.

2. The data transmission method according to claim 1, wherein the wake-up signaling comprises: identification information of the terminal; the identification information is preset identification information of the terminal or identification information of a group in which the terminal is located.

3. The data transmission method according to claim 2, wherein the identification information is preset information or a variant of the preset information;
   the preset information comprises one of International Mobile Subscriber Identity (IMSI), Serving-Temporary Mobile Subscriber Identity (S-TMSI), Temporary Mobile Subscriber Identity (TMSI), Packet-Temporary Mobile Subscriber Identity (P-TMSI), Resume ID and Configured ID;

the Configured ID is configured via a Radio Resource Control (RRC) release signaling or a suspend signaling;

the variant of the preset information is obtained in one of ways that comprise intercepting some bytes in the preset information, obtaining a remainder by dividing the preset information by a preset value, obtaining a hash function transformation identity (Hashed_ID) by performing hash function transformation of the preset information, and intercepting some bytes in the Hashed_ID.

4. The data transmission method according to claim 2, wherein the wake-up signaling further comprises system information change indication information.

5. The data transmission method according to claim 4, wherein when the wake-up signaling comprises the system information change indication information, the base station does not separately send a paging message and/or a corresponding physical downlink control channel (PDCCH) for change of the system information.

6. The data transmission method according to claim 2, wherein the wake-up signaling further comprises an indicator; the indicator is configured to indicate whether there is a paging message and/or a physical downlink control channel (PDCCH) to be transmitted in a discontinuous reception (DRX) cycle after the terminal receives the wake-up signaling.

7. The data transmission method according to claim 1, wherein the step of sending the wake-up signaling to the terminal, comprises: sending the wake-up signaling to the terminal on multiple beams by using beam sweeping.

8. The data transmission method according to claim 1, wherein the step of sending the wake-up signaling to the terminal, comprises: sending the wake-up signaling to the terminal at a preset time;
wherein the preset time comprises: a paging opportunity (PO) start time or a predetermined time before the PO start time;
wherein the predetermined time is predefined by a network or configured by the base station.

9. The data transmission method according to claim 1, wherein after the step of sending the wake-up signaling to the terminal, the method further comprises: sending a physical downlink control channel (PDCCH) and/or a paging message to the terminal.

10. The data transmission method according to claim 9, wherein the step of sending the PDCCH and/or the paging message to the terminal, comprises: sending the PDCCH and/or the paging message to the terminal on multiple beams by using beam sweeping.

11. A base station comprising: a memory, a processor and a computer program stored on the memory and executable by the processor; wherein the processor executes the computer program to implement steps of the data transmission method according to claim 1.

12. A data transmission method comprising:
in an inactive mode, receiving a wake-up signaling sent by a base station in case that the base station determines that there is a paging message to be sent to the terminal; and
performing a processing operation corresponding to the wake-up signaling according to the wake-up signaling.

13. The data transmission method according to claim 12, wherein the step of performing the processing operation corresponding to the wake-up signaling according to the wake-up signaling, comprises:
determining whether the wake-up signaling comprises identification information of a terminal;
when the wake-up signaling comprises the identification information of the terminal, monitoring a physical downlink control channel (PDCCH) and/or receiving a corresponding paging message on a resource scheduled by the PDCCH;
when the wake-up signaling does not comprise the identification information of the terminal, the terminal continuing to maintain a state, the state being a state of the terminal before receiving the wake-up signaling, or not monitoring the PDCCH at a time indicated by at least one paging frame (PF) and a paging opportunity (PO) in the same discontinuous reception (DRX) cycle after receiving the wake-up signaling;
wherein the identification information is preset identification information of the terminal or identification information of a group in which the terminal is located.

14. The data transmission method according to claim 13, wherein the identification information is preset information or a variant of the preset information;
the preset information comprises one of International Mobile Subscriber Identity (IMSI), Serving-Temporary Mobile Subscriber Identity (S-TMSI), Temporary Mobile Subscriber Identity (TMSI), Packet-Temporary Mobile Subscriber Identity (P-TMSI), Resume ID and Configured ID;
the Configured ID is configured via a Radio Resource Control (RRC) release signaling or a suspend signaling;
the variant of the preset information is obtained in one of ways that comprise intercepting some bytes in the preset information, obtaining a remainder by dividing the preset information by a preset value, obtaining a hash function transformation identity (Hashed_ID) by performing hash function transformation of the preset information, and intercepting some bytes in the Hashed_ID.

15. The data transmission method according to claim 13, further comprising: determining whether the wake-up signaling comprises system information change indication information;
when the wake-up signaling comprises the system information change indication information, after the terminal receives the wake-up signaling, the terminal receiving updated system information sent by the base station at a first preset resource location.

16. The data transmission method according to claim 13, further comprising:
determining whether the wake-up signaling comprises an indicator which is configured to indicate whether there is a paging message and/or a PDCCH to be transmitted in the DRX cycle after the terminal receives the wake-up signaling;
when the wake-up signaling comprises the indicator and the indicator indicates that there is no paging message and/or PDCCH to be transmitted in the DRX cycle after the wake-up signaling, the terminal continuing to maintain a state, the state being a state of the terminal before receiving the wake-up signaling, or, the terminal not monitoring the PDCCH and/or not receiving the corresponding paging message in the same DRX cycle after receiving the wake-up signaling, or, the terminal receiving updated system information sent by the base station at a second preset resource location;

when the wake-up signaling comprises the indicator and the indicator indicates that there is a paging message and/or PDCCH to be transmitted in the DRX cycle after the wake-up signaling, monitoring the PDCCH and/or receiving the corresponding paging message on a resource scheduled by PDCCH.

17. A terminal comprising: a memory, a processor and a computer program stored on the memory and executable by the processor; wherein the processor executes the computer program to implement steps of the data transmission method according to claim 12.

18. A computer readable storage medium storing a computer program, wherein the computer program is executed by a processor to implement steps of the data transmission method according to claim 1.

19. A computer readable storage medium storing a computer program; wherein the computer program is executed by a processor to implement steps of the data transmission method according to claim 12.

\* \* \* \* \*